United States Patent
Akiyama

[11] 3,943,091
[45] Mar. 9, 1976

[54] COMPOSITIONS FOR PREPARING ROOM TEMPERATURE VULCANIZING TYPE SILICONE RUBBERS

[76] Inventor: Taichiro Akiyama, 19-23, Shimoochiai 2-chome, Shinjuku, Tokyo, Japan

[22] Filed: Feb. 4, 1974

[21] Appl. No.: 439,205

[30] Foreign Application Priority Data
Mar. 17, 1973 Japan.................................. 48-31171

[52] U.S. Cl............................... 260/37 SB; 260/2 S
[51] Int. Cl.$^2$.......................................... C08L 83/04
[58] Field of Search........................ 260/37 SB, 2 S

[56] References Cited
UNITED STATES PATENTS

| | | | |
|---|---|---|---|
| 2,048,799 | 7/1936 | Lawson................. | 260/2 S X |
| 2,852,484 | 9/1958 | New..................... | 260/37 SB X |
| 2,890,188 | 6/1959 | Konkle et al........... | 260/37 SB X |
| 3,791,998 | 2/1974 | Bruns.................... | 260/37 SB X |

*Primary Examiner*—Lewis T. Jacobs
*Attorney, Agent, or Firm*—Ladas, Parry, Von Gehr, Goldsmith & Deschamps

[57] ABSTRACT

In a two part type composition for preparing room temperature vulcanizing type silicone, one part or a main agent comprises a putty like mixture of a siloxanediol expressed by a general formula

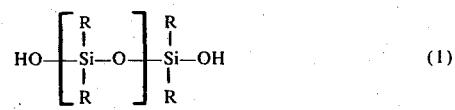
(1)

wherein R respectively represents a methyl radical, a phenyl radical or a vinyl radical, and $n$ is an intger of from 500 to 50,000 or

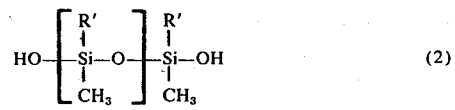
(2)

wherein R' respectively represents a hydrogen radical or a methyl radical and $n$ is an integer of from 2 to 1,000, and a fine powder of a filler, and the other part or an assistant agent comprises a putty like mixture of a polyol, Ca(OH)$_2$ and a fine powder of a filler. The main and assistant agents are combined in intimate contact with each other in the form of a cencentric assembly or a laminated assembly. Any suitable quantity of the assembly is severed and kneaded by hands to form a silicone rubber.

9 Claims, 4 Drawing Figures

COMPOSITIONS FOR PREPARING ROOM TEMPERATURE VULCANIZING TYPE SILICONE RUBBERS

BACKGROUND OF THE INVENTION

This invention relates to a composition for preparing room temperature vulcanizing (RTV) type silicone rubbers comprising a unitary combination of a main agent and an assistant agent characterized in that the combinaton does not vulcanize even when it is left standstill in air for a long interval.

Following compositions have been known and used in the art as the compositions for preparing RTV type silicone rubbers.

1. A condensation type two part composition

This composition comprises a combination of two discrete liquids, one consisting of a liquid siloxanediol (main agent) expressed by a general formula

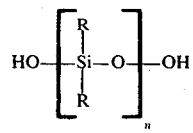

where R represents a methyl radical or a phenyl radical, and the other consisting of a liquid ethoxysilane bridging agent (assistant agent) expressed by a general formula

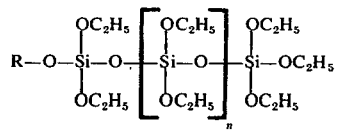

or Si $(OC_2H_5)_4$ or a liquid siloxanediolehydride bridging agent (assistant agent) expressed by a general formula

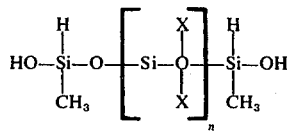

To prepare this composition, suitable quantities of the main and assistant agents are separately weighed and are then mixed together. Further, suitable quantities of a setting or vulcanization catalyst, such as tin butyl laurate, and a filler such as a ultra fine powder of silica or calcium carbonate are added to said mixture to cause it to vulcanize by a condensation reacton.

However, this composition is inconvinient to handle and is not economical because it is necessary to weigh and store independently the two liquid components.

2. An addition type two part composition

This composition also comprises a combination of two discrete liquids, one consisting of a liquid siloxane with terminal vinyl radicals (main agent) expressed by a general formula

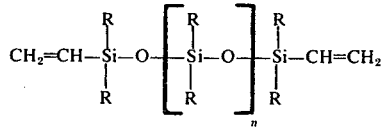

and the other consisting of a liquid siloxane with terminal hydrogen radicals acting as a bridging agent or an assistant agent. To use this composition, it is also necessary to separately weigh and mix together these two liquid components and then incorporate into the mixture suitable quantities of a setting catalyst, such as chloroplatinous acid $H_2PtCl_3 \cdot 6H_2O$, and a filler, such as a ultrafine powder of silica or calcium carbonate, so as to vulcanize the mixture by an additive reaction.

Like the first composition, this composition too is inconvenient to handle and is not economical.

3. One part type composition

This composition comprises a liquid mixture of a main agent consisting of a siloxanediol expressed by a general formula

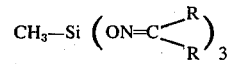

and an assistant agent consisting of a bridging agent in the form of an alkoxysilane containing $Si(OR)_4$, or an oxime type silane expressed by a general equation

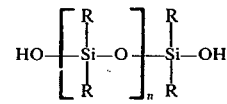

or an amine type silane containing $CH_3 - Si(NR_2)_3$. This composition vulcanizes when contacted by air.

Since this composition comprises a single liquid there is no inconvenience in handling it as in the two part type compositions but it is necessary to store it in a sealed tube or cartridge in order to prevent it from contacting with air.

SUMMARY OF THE INVENTION

Accordingly, it is an object of this invention to provide an improved two part type.composition for preparing a RTV type silicone rubber, comprising a unitary combination of a main agent and an assistant agent and does not vulcanize even when it is left standstill in air over a long time.

Another object of this invention is to provide an improved composition for preparing a RTV type silicone rubber which is easy to handle, pack, store, transport and use.

Still another object of this invention is to provide an improved composition for preparing a RTV type silicone rubber which can be used in many industrial and surgical applications.

Yet another object of this invention is to provide an improved composition for preparing a RTV type silicone rubber which does not contain or evolve any harmful substance which may permeate through the skin of human bodies.

A further object of this invention is to provide a novel composition for preparing a RTV type silicone rubber which can be foamed, if desired.

Still further object of this invention is to provide an improved two part type composition for preparing a RTV type silicone rubber, which comprises a unique combination of the main and assistant agents in the form of a concentric or a laminated assembly which is convenient to assemble, transport, store and use.

According to this invention these and further objects can be accomplished by providing a composition for preparing a RTV type silicone rubbers, said composition comprising a unitary combination of A. a putty like main agent containing a compound selected from the group consisting of siloxanediols expressed by general formula

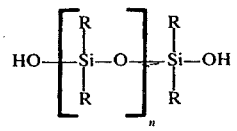

and

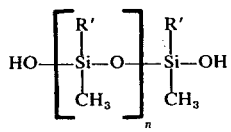

wherein, in formula (1), R respectively represents a methyl radical, a phenyl radical or a vinyl radical, and $n$ is an integer of from 500 to 50,000 and is formula (2), R' respectively represents a hydrogen radical or a methyl radical and $n$ is an integer of from 2 to 1,000, and a fine powder of a filler, and B. a putty like assistant agent containing a polyol, $Ca(OH)_2$ and a fine powder of a filler, said main and assistant agents being maintained in intimate contact with each other.

Variaous combinations of the main and assistant agents may be used. For example, a rod of the assistant agent is surrounded by a sleeve of the main agent and the assembly is contained in a container like a cosmetic stick. Alternatively, layers of the main and assistant agents may be laiminated. In use, a suitable length of the assembly is cut off by means of a suitable knife or thread, and the cut off assembly is kneaded with fingers. Then, the mixture will vulcanize within a very short time of only few minutes.

DESCRIPTION OF THE PREFERRED EMBODIMENTS

Preparation of the Main Agent

Figure 1:
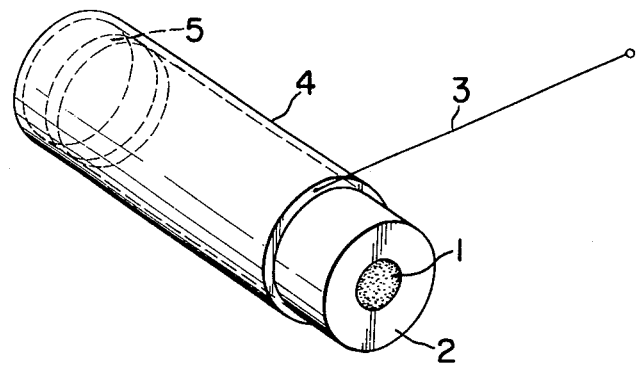
FIG. 1 shows a perspective view showing one example of the construction of the composition of the invention in the form of a cosmetic stick.

The putty like main agent utilized in this invention is prepared by intimately mixing together a siloxanediol compound expressed by said formula (1) or (2), and a fine powder of a filler. The ratio of the compound to the filler may be any value so long as the mixture can exhibite a putty like consistency. Ratios of the compound to the filler of from about 1:1 to about 13:1 are preferred. The compound may be siloxanediols expressed by formula (1) or (2) or both. Where a methylhydrogenpolysiloxanediol expressed by formula (2) and in which R' represents a hydrogen radical is used, as hydrogen is liberated at the time of vulcanization (or setting) it is possible to obtain spongy foamed rubber products. Actually, it is advantageous to use a mixture consisting of 99.5 to 95.0 parts by weight of the siloxanediol expressed by formula (1) and 0.5 to 5.0 parts by weight of said methylhydrogenpolysiloxanediol.

The fine powder of the filler is used to increase the viscosity of the main agent to the consistency of putty. As such as filler, may be used a ultra fine powder of silica having a particle size of from 5 to 60 m$\mu$, and a fine powder of talc. When desired, a suitable colouring agent (pigment) may be incorporated into the main agent according to the field of application thereof.

Preparation of the Assistant Agent

The putty like assistant agent utilized in this invention is prepared by homogeneously admixing a polyol, $Ca(OH)_2$, and a fine powder of a filler. Any ratio of these substances may be used so long as the resulting mixture can exhibit the consistency of putty. However, a mixture consisting of 100 parts by weight of a polyol, 20 to 40 parts by weight of $Ca(OH)_2$ and 80 to 120 parts by weight of a fine powder of a filler is preferred. The polyol functions as a bridging agent at the time of setting. Among the polyols utilized in this invention may be mentioned ethylene glycol, polyethylene glycol and polypropylene glycol. $Ca(OH)_2$ is used to act as a catalyst for the vulcanization reaction (setting reaction), and the fine powder of a filler is used for the purpose of increasing the viscosity of the assistant agent as in the case of the main agent. Again, a suitable colouring agent may be incorporated into the assistant agent, if desired.

Use of calcium hydroxide as the vulcanizing catalyst is more advantageous than prior art catalyst because it does not contain or produce any compound harmful to human bodies.

Prior art RTV type silicone rubbers were prepared by polymerizing a siloxanediol with an acidic or alkaline catalyst. It is considered that $Ca(OH)_2$ dispersed in the vulcanized silicone rubber will be preserved therein over a long time and that $Ca(OH)_2$ exposed on the surface of the silicone rubber will be converted into neutral calcium carbonate.

Contact between the Main and Assistant Agents

The composition of this invention comprises a unitary combination of the main and auxiliary agents, preferably at a ratio of 1 – 10:1, by volume, the main and auxiliary agents being maintained in intimate contact. The contact is provided by merely superposing layers of the main and assistant agents. The layers should not be kneaded together until use. Otherwise, the vulcanization reaction occurs.

Contact between the main and assistant agents may be effected in various manners. In the example shown in FIG. 1, a rod shaped core of the assistant agent 1 is surrounded by a sleeve of the main agent 2 and the assembly is contained in a container 4 of paper or plastic just like a cosmetic stick. As shown by dotted lines, a bottom plate 5 of the container is disposed to be slidable in the longitudinal direction, so that by depressing the bottom plate, any desired length of the assembly is pushed out of the container. Further, a cutting string 3 is attached to the opening of the container so that the pushed out length of the assembly can be readily cut away by wrapping the string 3 about the assembly and then pulling the string. If desired, a suitable removable cap may be provided for the container.

Figure 2:
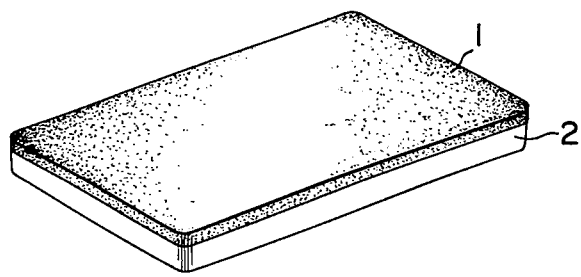
FIGS. 2 and 3 show modified constructions of the composition.
Figure 3:
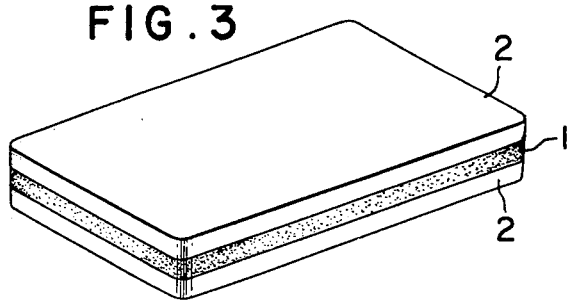
Figure 4:
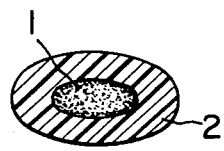
FIG. 4 shows a sectional view of the composition shaped into a tablet.

In the example shown in FIG. 2 a sheet of the assistant agent 1 is laminated on a sheet of the main agent 2, whereas in the example shown in FIG. 3, a sheet of the assistant agent 1 is sandwiched between two sheets of the main agents 2. If desired, any number of the sheets 1 and 2 may be laminated. FIG. 4 shows still another combination in which a core of the assistant agent 1 is encapsulated in a shell of the main agent 2 just like a tablet.

The novel composition comprising a unitary combination of the main and assistant agents does not vulcanize even when it is left standstill in air over an extended period, for example, over 24 months, at room temperature. Because, both the main and assistant agents have putty like consistency so that although they are maintained in an intimate contract over a wide area they do not diffuse through the interface, thus efficiently preventing vulcanization reaction. Although a slight vulcanization occurs at the interface, it is negligibly small. For this reason, the novel composition can be stored over a long period.

Vulcanization Reaction

As above described, to use the composition of this invention, a required quantity or length of the assembly of the main and assistance agents is cut away and then kneaded with fingers for 1 to 3 minutes. After being left standstill for several minutes the mixture undergoes perfect vulcanization reaction. Accordingly, it is necessary to shape the mixture into the desired product within this time by moulding, pressing and the like process. The vulcanization mechanism can be expressed by the following reactions which are caused by the catalytic action of Ca(OH)$_2$ contained in the assistant agent.

1. The condensation reaction between the siloxanediols expressed by formulae (1) and (2) in the main agent.
2. The condensation reaction of only the siloxanediol expressed by formula (1) in the main agent.
3. The condensation reaction between the siloxanediol expressed by formula (1) in the main agent and the polyol in the assistant agent.
4. The condensation reaction between the siloxanediol expressed by formula (2) in the main agent and the polyol in the assistant agent.

As mentioned above, since the composition of this invention comprises a unitary combination of the putty like main and assistant agents, it can be stored in air over a long period without causing vulcanization reaction. Moreover, as it is possible to cut away a length of the assembly containing the main and assistant agents in the desired proportion it is easy to vulcanize the cut length by merely kneading it with fingers for one or two minutes. Vulcanized silicone rubber can be used to manifacture materials to be embedded in human bodies by orthopedic operations, materials to make up damaged portions of human bodies, impressions prepared by dentists, putty rubbers for students, sealing members for various industrial applications, sealing plugs for bottles adapted to contain medicines and chemicals, ear plugs and the like.

Other setting catalyst such as tin dibutyl laurate, tin octoate, etc. may be added for the purpose of accelerating the vulcanization reaction of the composition.

Following examples are given by way of illustration but not to be construed to limit the scope of the invention.

EXAMPLE 1

Preparation of the Main Agent

Siloxanediols expressed by a general formula

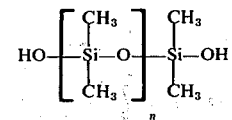

and in which $n$ equals to 500, 1,000, 5,000, 10,000, 30,000 and 50,000, respectively, were prepared. All of these siloxanediols were liquid at room temperature.

A ultra fine powder (having a particle size of from 5 to 60 m$\mu$) of the quantity shown in the following Table 1 was incorporated to 100 parts by weight of each silonediol and a suitable quantity of a pigment (iron oxide) was incorporated to each sample. The mixtures were admixed homogeneously to obtain putty like main agents A through F, which were shaped into sheets each having a thickness of about 10 mm.

Table 1

| | Composition of the main agents | | | | | |
|---|---|---|---|---|---|---|
| main agent | A | B | C | D | E | F |
| siloxanediol | n=500 | n=1,000 | n=5,000 | n=10,000 | n=30,000 | n=50,000 |
| parts by weight | 100 | 100 | 100 | 100 | 100 | 100 |
| fine powder of silica parts by weight | 100 | 50 | 25 | 17 | 11 | 8 |

Preparation of the Assistant Agent 100 parts by weight of ethyleneglycol (polyol), 35 parts by weight of Ca(OH)$_2$ and 100 parts by weight of a ultra fine powder of silica having a particle size of 5 to 60 m$\mu$ were admixed together and then a suitable quantity of a pigment (titanium white) was incorporated into the mixture to obtain a putty like assistant agent which was shaped into a rod having a diameter of about 10 mm and a length of about 100 mm.

Contact between the Main and Assistant Agents

The rod shaped assistant agent 1 was surrounded by a sleeve 2 of each one of the main agents A through F, and the assembly was cut into a stick having a diameter of about 30mm.

All compositions of this example did not vulcanized even when they were left standstill in air at room temperature for more than 24 months showing that their shelf life is much longer than that of the prior art one part type RTV silicone rubber. A suitable length of the stick shaped assembly was cut, and kneaded with fingers for 1 to 2 minutes. It was found that the vulcanization reaction was completed within few minutes. When compared with the prior art two part type RTV silicone rubbers, the novel composition is advantageous in that it is not necessary to store the main and assistant agents in discrete containers and that it is not necessary to weigh respective quantitives of the main and assistant agents at the time of use. As has been pointed out hereinabove, since the cross-sectional areas of the main and assistant agents have been selected to fulfil an adequate proportion, the relative quqntities of the main and assistant agents of the cut length always satisfy a predetermined ratio. Thus, it is possible to use the novel composition very conveniently.

EXAMPLE 2

Preparation of the Main Agent

Siloxanediols expressed by the following formulae were prepared

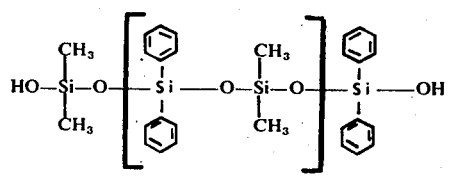

n = 5,000, liquid

A

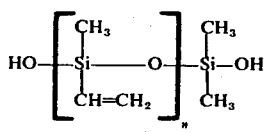

n = 5,000, liquid

B

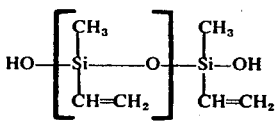

n = 5,000, liquid

C

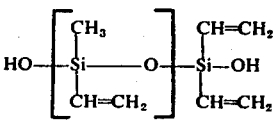

n = 5,000, liquid

D

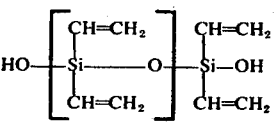

n = 5,000, liquid

E

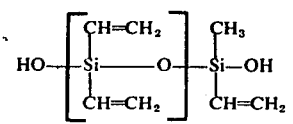

n = 5,000, liquid

F

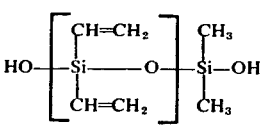

n = 5,000, liquid

G

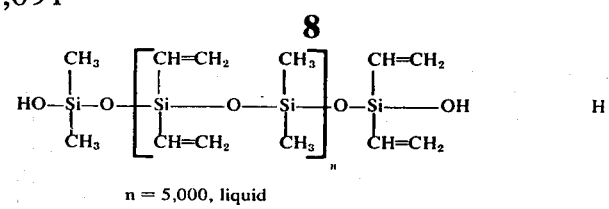

n = 5,000, liquid

H

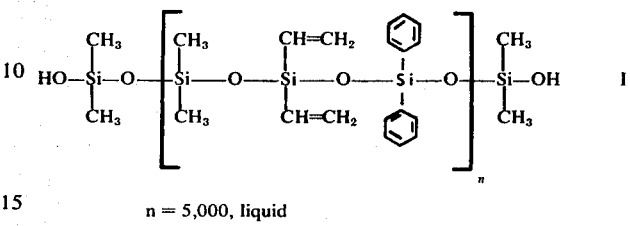

n = 5,000, liquid

I

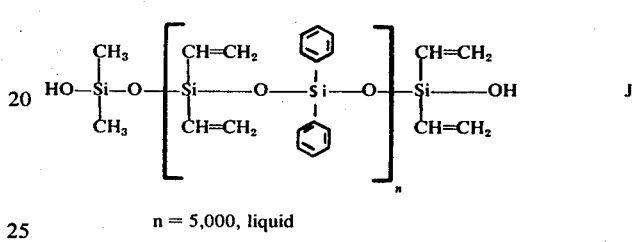

n = 5,000, liquid

J 25 parts by weight of a ultra fine powder of silica having a particle size of from 5 to 60 m$\mu$ and a suitable quantity of a pigment (iron oxide) were incorporated into 100 parts by weight of each of these siloxanediols and the respective mixtures were mixed homogeneously to obtain putty like main agents which were shaped into sheets, 110mm × 150mm × 30mm, each.

Preparation of the Assistant Agent

The same process steps as in Example 1 were followed to prepare a putty like assistant agent except that a fine powder of talc was substituted for the ultra fine powder of silica. The resulting assistant agent was shaped into a sheet of 100mm × 150mm × 10mm.

Contract between the Main and Assistant Agents

A sheet 1 of the assistant agent described above and a sheet 2 of respective main agents of this example were superposed as shown in FIG. 2 to obtain composite sheets.

Like the compositions of Example 1, the compositions of this example did not undergone any vulcanization reaction even when they were left standstill in air at room temperature for more than 24 months.

EXAMPLE 3

Preparation of the Main Agent

Methylhydrogenpolysiloxanediols expressed by the general formulae

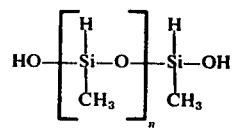

wherein $n$ is equal to 2, 10, 50, 100, 500 and 1,000, respectively were prepared. All of these methylhydrogenpolysiloxanediols were liquid at room temperature.

A fine powder of talk of the quantity shown in the following Table 2 and a suitable quantity of a pigment were incorporated into each of the methylhydrogenpolysiloxanediols described above, and respective mixtures were admixed homogeneously to obtain putty like main agents I through VI which were shaped into sheets each having a dimension of 100mm × 150mm × 10mm.

Table 2

| Composition of the main agent | | | | | | |
|---|---|---|---|---|---|---|
| main composition | I | II | III | IV | V | VI |
| diol | n=2 | n=10 | n=50 | n=100 | n=500 | n=1,000 |
| parts by weight | 100 | 100 | 100 | 100 | 100 | 100 |
| fine powder of talc parts by weight | 100 | 70 | 50 | 40 | 30 | 20 |

Preparation of the assistant agent

The method of example 1 was repeated to obtain a putty like assistant agent which was shaped into a sheet having a dimension of 100 mm × 150 mm × 10 mm.

Contact between the Main and Assistant Agents 6 compositions were prepared by sandwiching a sheet 1 of the just described assistance agent between two sheets 2 of one of the main agents I through VI described above as shown in FIG. 3.

In addition to the advantageous merits described above with reference to preceding examples, the compositions of this example liberate hydrogen during vulcanization, thus producing spongy foamed rubbers.

Following Table 3 and 4 show physical characteristics of the compositions of Examples 1 and 3.

Table 3

| Characteristic after vulcanization | | |
|---|---|---|
| | Example 3 | Example 1 |
| specific gravity (25°C) | 0.90 | 1.33 |
| vulcanizing time (min) | 6–7 | 7–10 |
| hardness (Shore A) | 10 | 53 |
| coefficient of linear expansion (%) | 15.0 | 0.2 |
| elongation (%) | 15 | 3.8 |
| tensile strength (kg/cm²) | 38 | 12 |
| deformation under load (%) | — | 0.2 |
| quantity of water absorbed (when heated in autoclave, at 120°C, for 20 minutes) | 2.1 | 0.7 |

$n = 5,000$ (liquid)

5 parts by weight of methylhydrogenpolysiloxanediol expressed by a general formula

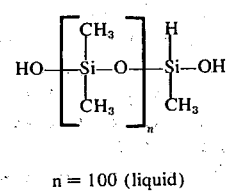

$n = 100$ (liquid)

and 30 parts by weight of a ultra fine powder of silica having a particle size of 5 to 60 mμ were admixed homogeneously to obtain a putty like main agent.

Then ethylene glycol, Ca(OH)₂ and a ultra fine powder of silica having a grain size of 5 to 60 mμ were admixed homogeneously at the same weight ratio as in Example 1 to obtain a putty like assistant agent.

These main and assistant agents were combined in the same manner as in Example 1 to obtain a cosmetic stick shaped composite composition as shown in FIG. 1.

The composition of this invention does not vulcanize when left standstill in air at room temperature for more than 24 months and upon vulcanization it evolves hydrogen to form foamed silicone rubber.

Table 4

| Heat resistance property when heated at 200°C | | | | |
|---|---|---|---|---|
| | Example 3 | | Example 1 | |
| | 200°C, 1 day | 200°C, 5 days | 200°C, 1 day | 200°C, 5 days |
| hardness (Shore A) | 9 | 5 | 50 | 49 |
| tensile strength (kg/cm²) | 3 | 2.5 | 6 | 5 |
| tear strength (kg/cm²) | 2.8 | 2.5 | 9 | 5 |
| % of linear schinkage | less than 0.5 | less than 0.5 | less than 0.5 | less than 0.5 |
| heat loss (%) | 0.3 | 0.4 | 0.2 | 0.3 |

EXAMPLE 4

95 parts by weight of a cyclohexanediol expressed by a general formula

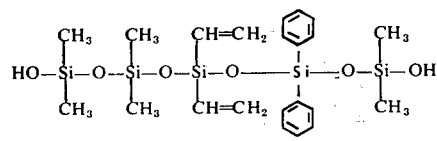

EXAMPLE 5

96 parts by weight of a siloxanediol expressed by a general formula

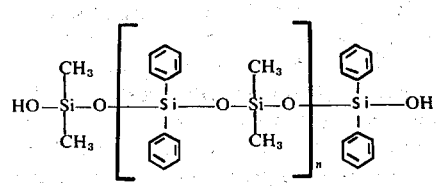

-continued n = 5,000 (liquid)

4 parts by weight a siloxanediol expressed by a general formula

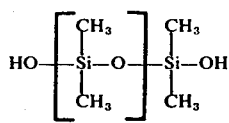

n = 100 (liquid)

and 30 parts by weight of a ultra fine powder of silica having a particle size of 5 to 60 mμ were admixed homogeneously to obtain a putty like main agent.

Then, ethylene glycol, Ca(OH)$_2$ and a ultra fine powder of silica having a particle size of 5 to 60 mμ were admixed homogeneously at the same weight ratio as in Example 1 to obtain a putty like assistant agent.

The main and assistant agents were combined in the same manner as in Example 1 and obtained a composite cosmetic stick shapted composition as shown in FIG. 1.

Again, the composition does not vulcanize when left standstill in air at room temperature for more than 24 months and is convenient to handle.

EXAMPLE 6

45 parts by weight of a siloxanediol expressed by a general formula

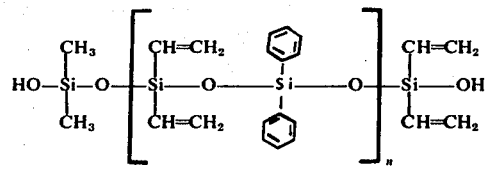

n = 5,000, liquid 5 parts by weight of a methylhydrogenpolysiloxanediol expressed by a general formula

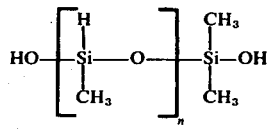

and 30 parts by weight of a ultra fine powder of silica having a particle size of 5 to 60 mμ were admixed homogeneously to obtain a main agent.

Then, ethylene glycol, Ca(OH)$_2$ and a ultra fine powder of silica having a particle size of 5 to 60 mμ were admixed homogeneously at the same weight ratio as in Example 1 to obtain a putty like assistant agent.

The main and assistant agents just described were combined to obtain a cosmetic stick shaped composite composition as shown in FIG. 1.

Again, the composition does not vulcanize in air at room temperature over a long period exceeding 24 months. Moreover, the composition liberates hydrogen during vulcanization, thus forming foamed rubber.

EXAMPLE 7

Preparation of the Main Agent

In this example, a putty like main agent was prepared by a method similar to Example 4 except that a fine powder of talc was substituted for the powder of silica.

Preparation of the assistant agent

Polypropylene glycol and polyethylene glycol were selected to act as polyols.

Ca(OH)$_2$ and a fine powder of talc were incorporated into 100 parts by weight of respective glycols at the weight ratios shown in the following Tables V-A and V-B. Further, a suitable quantity of a pigment (titanium white) was incorporated and admixed homogeneously with resulting mixtures to obtain putty like assistant agents A and B.

Table V-A

| Composition of assistant agent A | |
|---|---|
| | A |
| polyethylene glycol, parts by weight | 100 |
| Ca (OH)$_2$ parts by weight | 40 |
| fine powder of talc, parts by weight | 120 |

Table V-B

| Composition of assistant agent B | |
|---|---|
| | B |
| polypropylene glycol, parts by weight | 100 |
| Ca (OH)$_2$, parts by weight | 40 |
| fine powder of talc, parts by weight | 120 |

Contact between Main and Assistant Agents

Two types of cosmetic stick shaped compositions as shown in FIG. 1 were prepared by combining said main agents with assistant agents A and B respectively.

Again, these composite compositions do not vulcanize in air at room temperature when they are left standstill for more than 24 months. They are extremely easy to handle and liberate hydrogen when vulcanized to form foamed rubbers.

I claim:

1. A composite article for preparing room temperature vulcanizing type silicone rubbers, said article comprising a combination of:

A. at least one part of a putty like primary agent containing a compound selected from the group consisting of siloxanediols expressed by general formulae

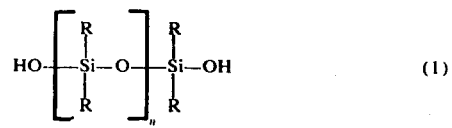

and

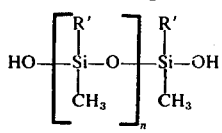

wherein, in formula (1), R respectively represents a methyl radical, a phenyl radical or a vinyl radical, and n is an integer of from 500 to 50,000 and in formula (2), R' respectively represents a hydrogen radical and n is an integer of from 2 to 1,000 and a fine powder of a filler, the weight ratio of said compound to said filler being from 1:1 to 13:1, and B. at least another part of a putty like secondary agent containing a polyhydric alcohol, $Ca(OH)_2$ and a fine powder of a filler, having a weight ratio of 100 parts by weight of the polyol, 20–40 parts by weight of $Ca(OH)_2$, and 80–120 parts be weight of the fine powder filler, said primary and secondary agents shaped as independent bodies or masses, and maintained in intimate contact at the interfaces thereof.

2. The composite article as claimed in claim 1, wherein said siloxanediol comprises a liquid mixture of siloxanediol expressed by said formula (1) and a methylhydrogenpolysiloxanediol expressed by said formula (2) at a weight ratio of 99.5 – 95.0 : 0.5–5.0.

3. The composite article as claimed in claim 1, wherein said filler comprises a fine powder of an inorganic filler having a particle size of from 5 to 60 m$\mu$.

4. The composite article as claimed in claim 1, wherein said primary agent further comprises a coloring agent.

5. The composite article as claimed in claim 1, wherein said polyhydric alcohol is selected from the group consisting of ethylene glycol, polyethylene glycol and polypropylene glycol.

6. The composite article as claimed in claim 1, wherein said secondary agent further comprises a coloring agent.

7. The composite article as claimed in claim 1, which contains said primary and secondary agents in a volume ratio of 1 – 10 : 1.

8. The composite article as claimed in claim 1, wherein each of said primary and secondary agents have a consistency such that they do not diffuce through the interface therebetween.

9. A vulcanized rubber article prepared by kneading the composite article claimed in claim 1.

* * * * *